US012092993B2

(12) United States Patent
Tamaki et al.

(10) Patent No.: US 12,092,993 B2
(45) Date of Patent: Sep. 17, 2024

(54) IMAGE FORMING APPARATUS

(71) Applicant: KYOCERA Document Solutions Inc., Osaka (JP)

(72) Inventors: Kenichi Tamaki, Osaka (JP); Hiroshi Yamazaki, Osaka (JP); Junichi Nakagawa, Osaka (JP); Takuji Watanabe, Osaka (JP); Tamotsu Shimizu, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 18/332,440

(22) Filed: Jun. 9, 2023

(65) Prior Publication Data

US 2023/0408976 A1 Dec. 21, 2023

(30) Foreign Application Priority Data

Jun. 16, 2022 (JP) ................................ 2022-097215

(51) Int. Cl.
*G03G 21/20* (2006.01)
*G03G 15/08* (2006.01)
*G03G 15/09* (2006.01)

(52) U.S. Cl.
CPC ....... *G03G 21/206* (2013.01); *G03G 15/0848* (2013.01); *G03G 15/0898* (2013.01); *G03G 15/0921* (2013.01)

(58) Field of Classification Search
CPC ............ G03G 21/206; G03G 15/0896; G03G 15/0898; G03G 15/0921
See application file for complete search history.

(56) References Cited

U.S. PATENT DOCUMENTS

| | | | | |
|---|---|---|---|---|
| 11,977,350 | B2 * | 5/2024 | Nakagawa | G03G 21/10 |
| 2014/0205311 | A1 * | 7/2014 | Kashimoto | G03G 15/0898 399/98 |
| 2015/0117895 | A1 * | 4/2015 | Yoneda | G03G 15/0898 399/99 |
| 2020/0326654 | A1 * | 10/2020 | Mizutani | G03G 21/10 |
| 2022/0197186 | A1 * | 6/2022 | Harada | G03G 21/1832 |
| 2023/0408964 | A1 * | 12/2023 | Nakagawa | G03G 15/0808 |
| 2023/0408974 | A1 * | 12/2023 | Watanabe | G03G 21/206 |
| 2023/0408975 | A1 * | 12/2023 | Yamazaki | G03G 21/206 |
| 2024/0176262 | A1 * | 5/2024 | Shimizu | G03G 15/0898 |

(Continued)

FOREIGN PATENT DOCUMENTS

JP 2008-145826 A 6/2008

*Primary Examiner* — Carla J Therrien
(74) *Attorney, Agent, or Firm* — Stein IP, LLC

(57) ABSTRACT

Provided is an image forming apparatus in which, while image formation is prevented from being performed, scattered toner that has dropped from a filter and adhered to an outer peripheral surface of a developer carrying member is recovered. A fixed magnet of the developer carrying member has a first pole that is arranged to face the filter, and a second pole and a third pole on a downstream side relative to the first pole. The first pole and the second pole have polarities opposite to each other, and the second pole and the third pole have a same polarity. A length of a gap between the developing container and an area where the developing sleeve faces the second pole among areas of the developing sleeve is smaller than a length between the developing sleeve and the filter.

9 Claims, 6 Drawing Sheets

(56) References Cited

U.S. PATENT DOCUMENTS

| | | | | |
|---|---|---|---|---|
| 2024/0176270 | A1* | 5/2024 | Shimizu | G03G 15/50 |
| 2024/0176271 | A1* | 5/2024 | Shimizu | G03G 15/095 |
| 2024/0176289 | A1* | 5/2024 | Tamaki | G03G 21/206 |

* cited by examiner

IMAGE FORMING APPARATUS

INCORPORATION BY REFERENCE

This application is based on and claims the benefit of priority from Japanese Patent Application No. 2022-097215 filed on Jun. 16, 2022, the contents of which are hereby incorporated by reference.

BACKGROUND

The present disclosure relates to an image forming apparatus.

In widely-used electrophotographic image-forming apparatuses such as a copying machine and a printer, toner is supplied onto an electrostatic latent image formed on an outer peripheral surface of an image bearing member such as a photosensitive drum, and then the electrostatic latent image is developed. In this way, a toner image to be transferred onto sheets is formed. In order to continuously form uniform images, the image forming apparatuses cause developer that is contained in a developing container and that contains the toner to be stirred and conveyed in the developing container.

Such related-art image forming apparatuses have a risk that the toner scatters from an inside to an outside of the developing container, and that insides of the apparatuses are fouled with the scattered tonner.

SUMMARY

According to an aspect of the present disclosure, there is provided an image forming apparatus including: an image bearing member; a charging unit; a cleaning unit; a developing device; a voltage application section; and a control section.

The image bearing member has an outer peripheral surface on which an electrostatic latent image is formed.

The charging unit is configured to charge the outer peripheral surface of the image bearing member.

The cleaning unit is configured to clean the outer peripheral surface of the image bearing member.

The developing device includes a developing container, a developer conveying member, and a developer carrying member.

The developing container is configured to contain developer that contains toner to be supplied to the image bearing member.

The developer conveying member is supported in a conveying chamber of the developing container in a manner that allows the developer conveying member to rotate, and is configured to circulate the developer by stirring and conveying the developer.

The developer carrying member is supported in the developing container in a manner that allows the developer carrying member to rotate while the developer carrying member faces the image bearing member, and is configured to supply the toner in the conveying chamber to the image bearing member.

The voltage application section is configured to apply developing voltage to the developer carrying member.

The control section is configured to control the image bearing member, the charging unit, the cleaning unit, the developing device, and the voltage application section.

The developing device includes a toner trapping mechanism that includes a duct, a filter, an exhaust fan, and a vibration generating unit.

The duct is connected to the conveying chamber, and is configured to allow air in the conveying chamber to flow through the duct.

The filter is arranged at a portion where the duct and the conveying chamber are connected to each other above the developer carrying member, and is configured to trap the toner that flows from the conveying chamber into the duct.

The exhaust fan is configured to cause the air in the conveying chamber to flow out to an outside through the duct.

The vibration generating unit is configured to vibrate the filter.

The control section is capable of carrying out a scattered-toner recovery mode in which, while image formation is prevented from being performed, scattered toner that has dropped from the filter and adhered to an outer peripheral surface of the developer carrying member is recovered by the cleaning unit through intermediation of the image bearing member by causing, by the control section, the vibration generating unit to vibrate the filter, by causing, by the control section, the charging unit and the voltage application section to cause a potential difference in a direction in which the toner is moved from the developer carrying member to the image bearing member, by causing, by the control section, the developer carrying member to rotate in a direction reverse to a direction at a time of the image formation, and by causing, by the control section, the image bearing member to rotate in a same direction as a direction at the time of the image formation.

The developer carrying member includes a developing sleeve and a fixed magnet.

The developing sleeve has a hollow cylindrical shape, is rotatable, and is configured to carry the developer on an outer peripheral surface of the developing sleeve.

The fixed magnet is fixed in the developing sleeve in a manner that prevents the fixed magnet from rotating, and has a plurality of magnetic poles that are arrayed along a circumferential direction of the developing sleeve.

The plurality of magnetic poles includes a first pole that is arranged to face the filter, a second pole that is arranged following the first pole on a downstream side relative to vertically below a downstream end of the filter in the rotation direction of developing sleeve, and a third pole that is arranged following the second pole on a downstream side relative to the second pole.

The first pole and the second pole have polarities opposite to each other.

The second pole and the third pole have a same polarity.

An area where the developing sleeve faces the second pole among areas of the developing sleeve is arranged with a gap relative to the developing container.

A length of the gap is smaller than a length between the developing sleeve and the filter.

DETAILED DESCRIPTION

Now, an embodiment of the present disclosure is described with reference to the drawings. Note that, the present disclosure is not limited to the following content.

Figure 1:
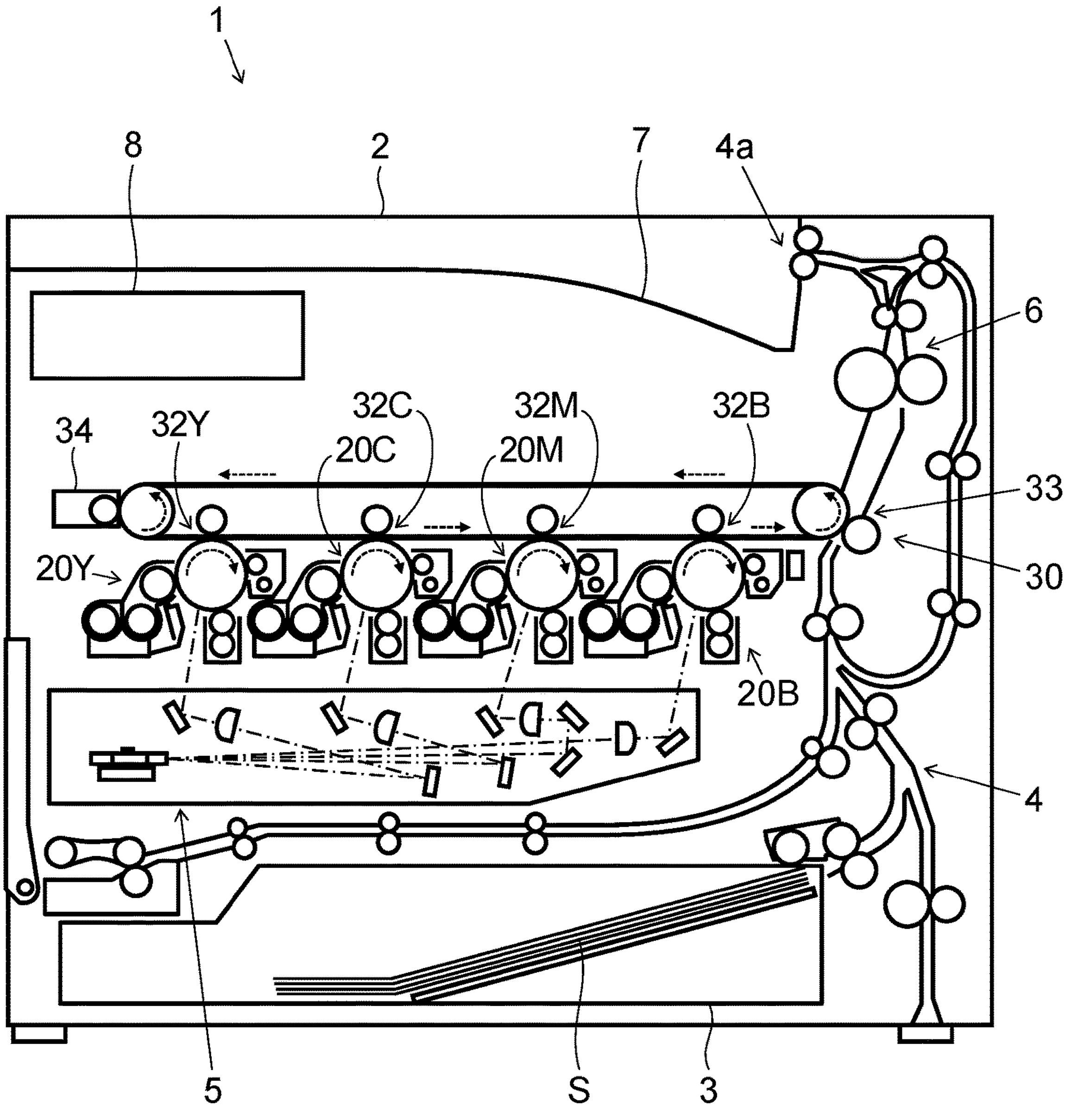
FIG. 1 is a schematic cross-sectional front view of an image forming apparatus according to an embodiment of the present disclosure.
Figure 2:
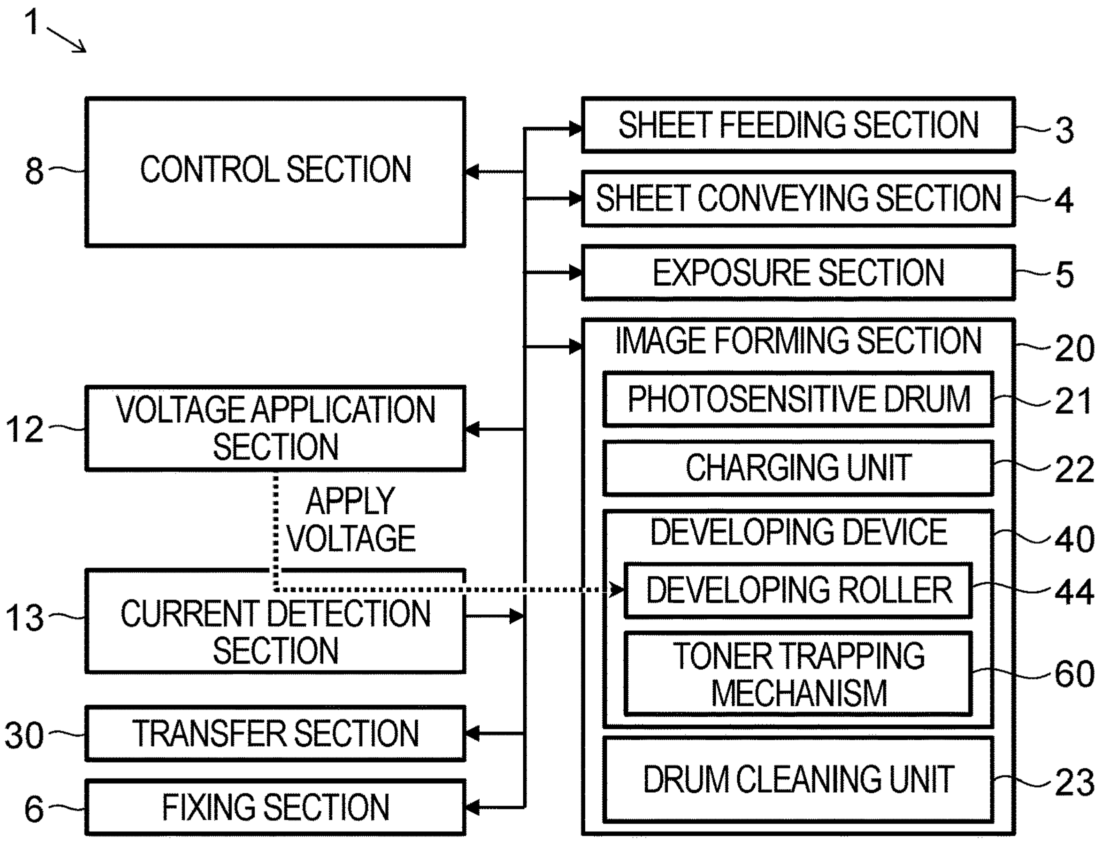
FIG. 2 is a block diagram showing a configuration of the image forming apparatus in FIG. 1.
Figure 3:
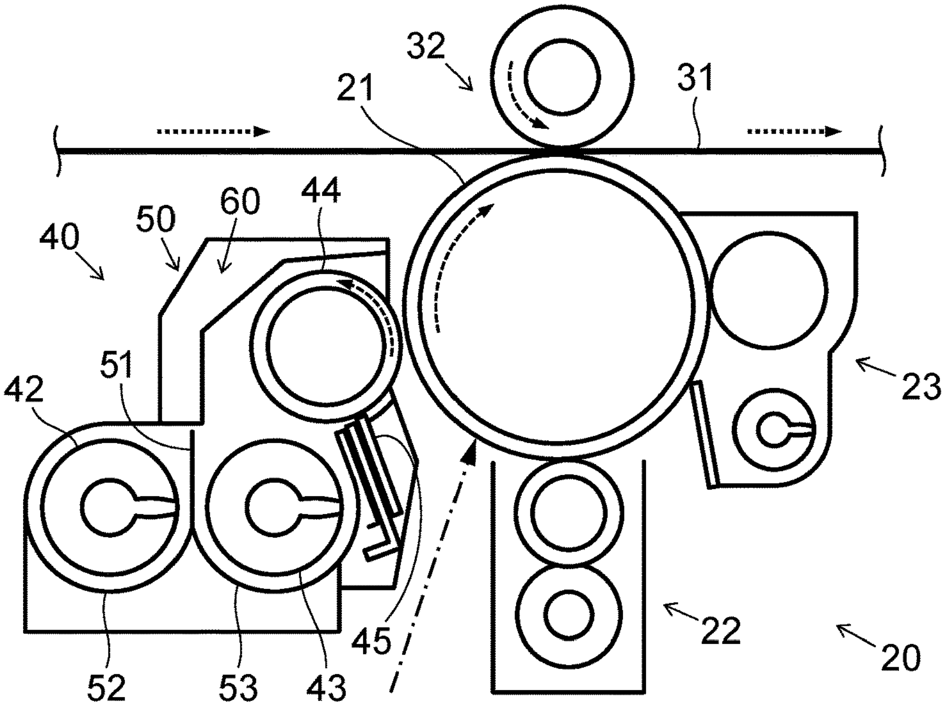
FIG. 3 is a schematic cross-sectional front view of a vicinity of an image forming section of the image forming apparatus in FIG. 1.

FIG. 1 is a schematic cross-sectional front view of an image forming apparatus 1 according to the embodiment. FIG. 2 is a block diagram showing a configuration of the image forming apparatus 1 in FIG. 1. FIG. 3 is a schematic cross-sectional front view of a vicinity of an image forming section 20 of the image forming apparatus 1 in FIG. 1. The image forming apparatus 1 according to this embodiment is, for example, a tandem color printer that transfers toner images onto sheets S with use of an intermediate transfer belt 31. The image forming apparatus 1 may be, for example, what is called a multifunction peripheral having functions such as printing, scanning (image reading), and facsimile transmission.

As shown in FIG. 1, FIG. 2, and FIG. 3, the image forming apparatus 1 has a body 2 including a sheet feeding section 3, a sheet conveying section 4, an exposure section 5, the image forming section 20, a transfer section 30, a fixing section 6, a sheet delivery section 7, and a control section 8.

The sheet feeding section 3 is arranged in a bottom portion of the body 2. The sheet feeding section 3 stores the plurality of unprinted sheets S, and sends out the sheets S one by one at a time of printing. The sheet conveying section 4 extends in an upper-and-lower direction along a side wall of the body 2. The sheet conveying section 4 conveys the sheets S sent out from the sheet feeding section 3 to a secondary transfer unit 33 and the fixing section 6, and delivers the sheets S after fixation onto the sheet delivery section 7 through a sheet delivery port 4*a*. The exposure section 5 is arranged above the sheet feeding section 3. The exposure section 5 applies laser beams controlled on the basis of image data to the image forming section 20.

The image forming section 20 is arranged above the exposure section 5 and under the intermediate transfer belt 31. The image forming section 20 includes an image forming section 20Y corresponding to yellow, an image forming section 20C corresponding to cyan, an image forming section 20M corresponding to magenta, and an image forming section 20B corresponding to black. These four image-forming sections 20 basically have the same structure. Thus, in the following description, unless specific description is necessary, identification symbols "Y," "C," "M," and "B" that respectively represent the colors may be omitted.

The image forming section 20 includes a photosensitive drum (image bearing member) 21 which is supported in a manner that allows the photosensitive drum 21 to rotate in a predetermined direction (clockwise in FIG. 1 and FIG. 3). The image forming section further includes, around the photosensitive drum 21, a charging unit 22, a developing device 40, and a drum cleaning unit (cleaning unit) 23 that are arranged along the rotation direction. Note that, a primary transfer unit 32 is arranged between the developing device 40 and the drum cleaning unit 23.

The photosensitive drum 21 is formed into a cylindrical shape that extends in a horizontal direction, and has, on its outer peripheral surface, a photosensitive layer formed, for example, of an amorphous-silicon photosensitive member. The charging unit 22 charges the surface (outer peripheral surface) of the photosensitive drum 21 with a predetermined potential. The exposure section 5 exposes the outer peripheral surface of the photosensitive drum 21, the outer peripheral surface having been charged by the charging unit 22, thereby forming an electrostatic latent image of an original image on the outer peripheral surface of the photosensitive drum 21. The developing device 40 supplies toner onto and develops the electrostatic latent image, thereby forming a toner image. The four image-forming sections each form the toner image in a corresponding one of the different colors. After the toner image has been primarily transferred onto an outer peripheral surface of the intermediate transfer belt 31, the drum cleaning unit 23 cleans off residual toner and the like from the outer peripheral surface of the photosensitive drum 21. In such a way, the image forming sections forms images (the toner images) to be transferred onto the sheets S.

The transfer section 30 includes the intermediate transfer belt 31, primary transfer units 32Y, 32C, 32M, and 32B, the secondary transfer unit 33, and a belt cleaning unit 34. The intermediate transfer belt 31 is arranged over the four image-forming sections 20. The intermediate transfer belt 31 is an endless intermediate-transfer member which is supported in a manner that allows the intermediate transfer belt 31 to rotate in a predetermined direction (counterclockwise in FIG. 1), and onto which the toner images formed respectively in the four image-forming sections 20 are primarily transferred sequentially in a superimposed manner. The four image-forming sections 20 are arranged in what is called a tandem fashion, that is, are arrayed in line from an upstream side toward a downstream side in the rotation direction of the intermediate transfer belt 31.

The primary transfer units 32Y, 32C, 32M, and 32B are arranged above the image forming sections 20Y, 20C, 20M, and 20B corresponding respectively to the colors with the intermediate transfer belt 31 sandwiched therebetween. The secondary transfer unit 33 is arranged on an upstream side relative to the fixing section 6 in a sheet conveying direction of the sheet conveying section 4 and on a downstream side relative to the four image-forming sections 20Y, 20C, 20M, and 20B in the rotation direction of the intermediate transfer belt 31. The belt cleaning unit 34 is arranged on a downstream side relative to the secondary transfer unit 33 in the rotation direction of the intermediate transfer belt 31.

The primary transfer unit 32 transfers the toner image formed on the outer peripheral surface of the photosensitive drum 21 onto the intermediate transfer belt 31. Specifically, the toner images are primarily transferred onto the outer peripheral surface of the intermediate transfer belt 31 at the primary transfer units 32Y, 32C, 32M, and 32B corresponding respectively to the colors. In addition, along with rotation of the intermediate transfer belt 31, the toner images of the four image-forming sections 20 are transferred successively in the superimposed manner onto the intermediate transfer belt 31 at predetermined timings. With this, a color toner image in which the toner images in the four colors of yellow, magenta, cyan, and black are superimposed on each other is formed on the outer peripheral surface of the intermediate transfer belt 31.

The color toner image on the outer peripheral surface of the intermediate transfer belt 31 is transferred onto the sheets S at a secondary-transfer nip unit, that is, at the secondary transfer unit 33, the sheets S having been sent in synchronization by the sheet conveying section 4. The belt cleaning unit 34 cleans off deposit such as residual toner on the outer peripheral surface of the intermediate transfer belt 31 after the secondary transfer. In such a way, the transfer section 30 transfers (records) the toner images that have been formed on the outer peripheral surfaces of the photosensitive drums 21 onto the sheets S.

The fixing section 6 is arranged above the secondary transfer unit 33. The fixing section 6 fixes the toner images onto the sheets S by heating and pressing the sheets S on which the toner images have been transferred.

The sheet delivery section 7 is arranged above the transfer section 30. The sheets S that have been printed through the fixation of the toner images are conveyed to the sheet delivery section 7. The sheet delivery section 7 allows the printed sheets (printed matters) S to be taken out from above.

The control section 8 includes a CPU, an image processing unit, a storage unit, and other electronic circuits and electronic components (none of which is shown). The CPU controls operations of the components provided in the image forming apparatus 1 on the basis of control programs and data stored in the storage unit, thereby executing processes relating to functions of the image forming apparatus 1. The sheet feeding section 3, the sheet conveying section 4, the exposure section 5, the image forming section 20, the transfer section 30, and the fixing section 6 receive commands individually from the control section 8, and print the sheets S in conjunction with each other. The storage unit is constituted by a combination of non-volatile storage devices such as a program ROM (Read Only Memory) and a data ROM, and a volatile storage device such as a RAM (Random Access Memory).

In addition, as shown in FIG. 2, the image forming apparatus 1 further includes a voltage application section 12 and a current detection section 13.

The voltage application section 12 includes a power source unit and a control circuit (none of which is shown). The voltage application section 12 is electrically connected to a developing roller (developer carrying member) 44 described below of the developing device 40. The voltage application section 12 applies developing voltage to the developing roller 44. The control section 8 causes the voltage application section 12 to control timing of the application of the developing voltage to the developing roller 44, a value and a polarity of the voltage, duration of the application, and the like.

The current detection section 13 detects current that flows between the photosensitive drum 21 and the developing roller 44 at a time when the developing voltage is applied to the developing roller 44. The control section 8 receives, from the current detection section 13, information about the current that the current detection section 13 has detected.

Figure 4:
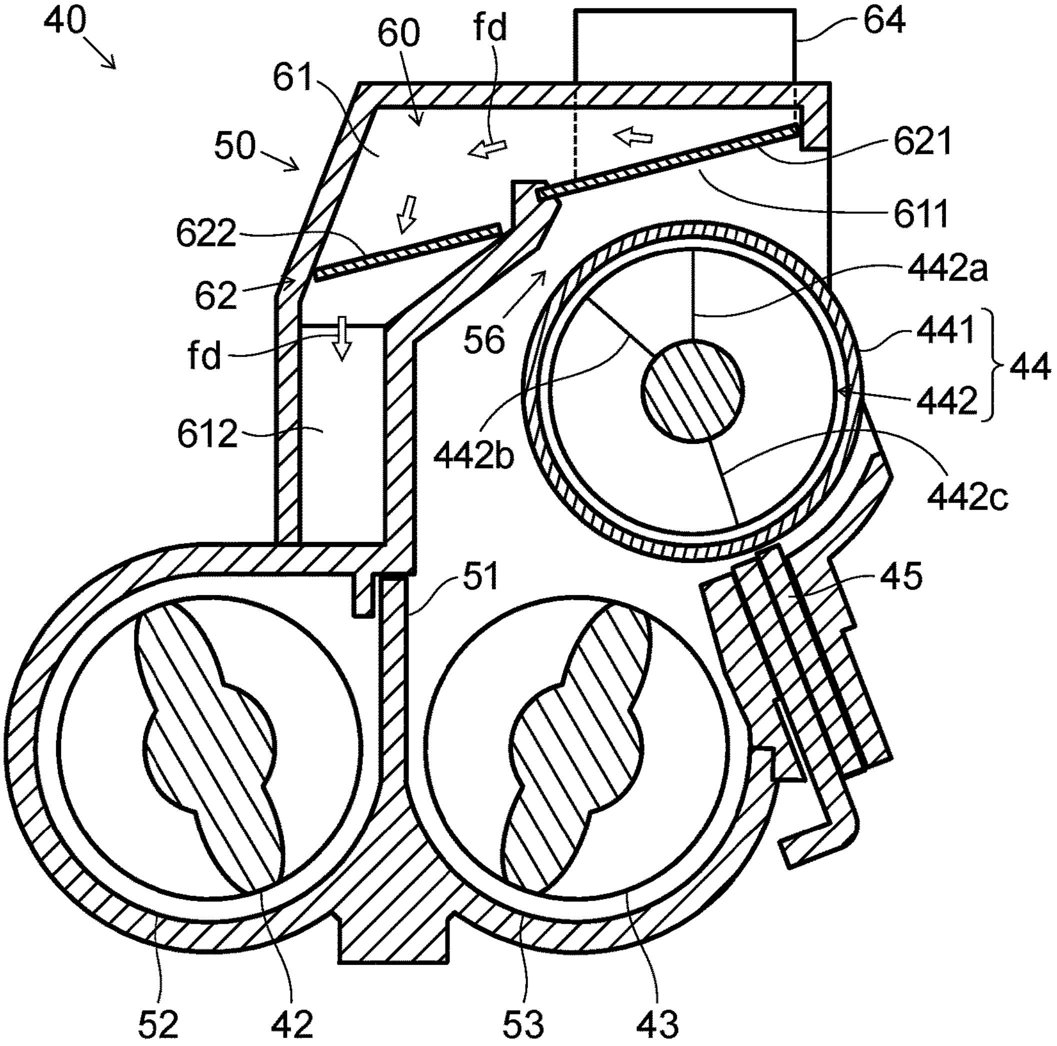
FIG. 4 is a perpendicular cross-sectional front view of a developing device of the image forming section in FIG. 3.
Figure 5:
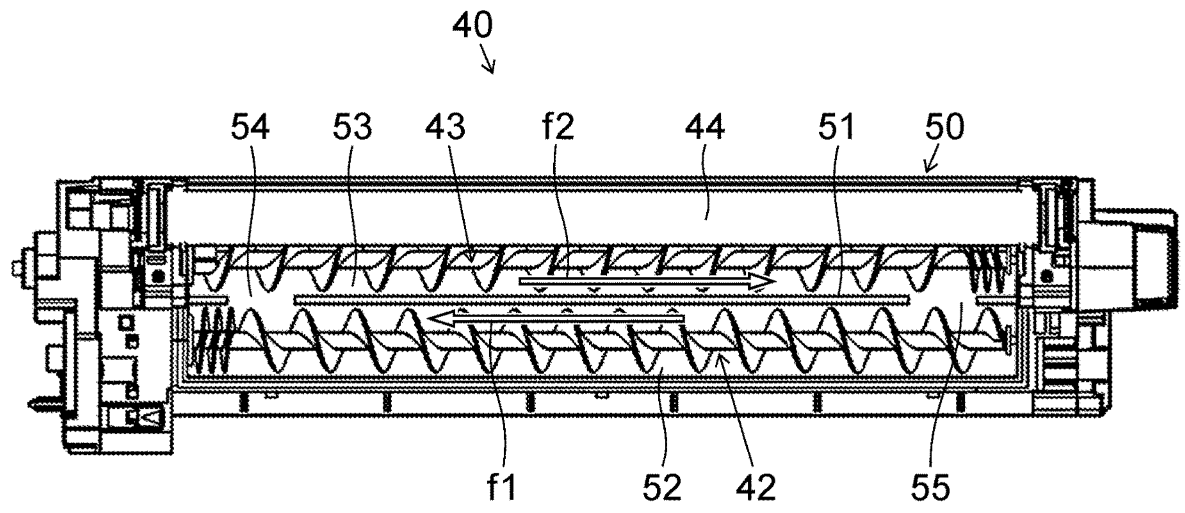
FIG. 5 is a horizontal cross-sectional plan view of the developing device of the image forming section in FIG. 3.
Figure 6:
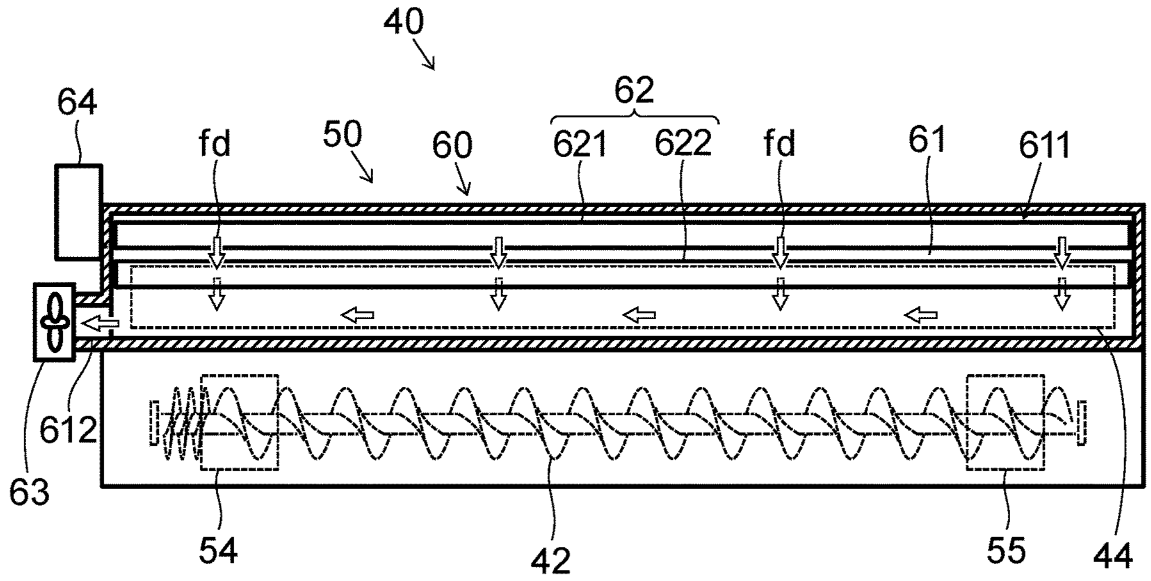
FIG. 6 is a perpendicular cross-sectional side view of the developing device of the image forming section in FIG. 3.
Figure 7:
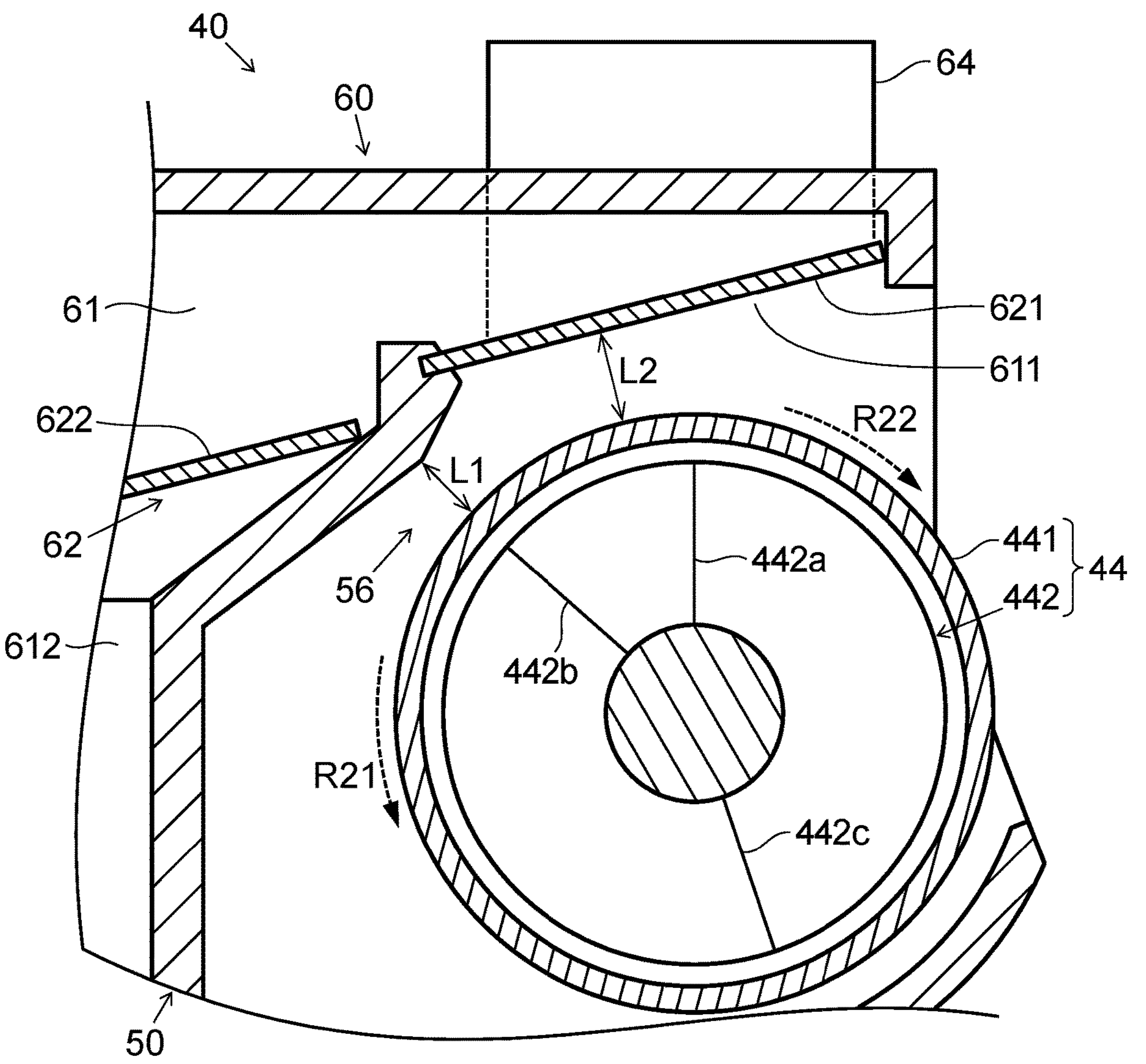
FIG. 7 is a partially enlarged perpendicular cross-sectional front view of the developing device in FIG. 4.

Next, a configuration of the developing device 40 is described with reference not only to FIG. 2 and FIG. 3, but also to FIG. 4, FIG. 5, FIG. 6, and FIG. 7. FIG. 4, FIG. 5, and FIG. 6 are respectively a perpendicular cross-sectional front view, a horizontal cross-sectional plan view, and a perpendicular cross-sectional side view of the developing device 40 of the image forming section 20 in FIG. 3. FIG. 7 is a partially enlarged perpendicular cross-sectional front view of the developing device 40 in FIG. 4. Note that, the developing devices 40 corresponding respectively to the colors basically have the same configuration, and hence the identification symbols that respectively represent the colors are not added to the components, and redundant description thereof is omitted. In addition, in the following description, an "axial direction" refers to a direction of a rotation axis of each of the photosensitive drum 21, a first conveying member 42, a second conveying member 43, and the developing roller 44 that are extend parallel to each other (depth direction in the drawing sheets of FIG. 3, FIG. 4, and FIG. 7, that is, right-and-left lateral direction in FIG. 5 and FIG. 6).

The developing device 40 supplies the toner onto the outer peripheral surface of the photosensitive drum 21. The developing device 40 is attachable to and detachable from, for example, the body 2 of the image forming apparatus 1. The developing device 40 includes a developing container 50, the first conveying member (developer conveying member) 42, the second conveying member (developer conveying member) 43, the developing roller (developer carrying member) 44, and a regulating member 45.

The developing container 50 has an elongated shape that extends along the axial direction of the photosensitive drum 21, and is arranged to be horizontal in its longitudinal direction. In other words, the longitudinal direction of the developing container 50 is parallel to the axial direction of the photosensitive drum 21. As developer that contains the toner to be supplied to the photosensitive drum 21, the developing container 50 contains, for example, two-component developer that contains the toner and magnetic carrier. The developer may be, for example, magnetic one-component developer that contains magnetic toner, or non-magnetic one-component developer.

The developing container 50 includes a partition portion 51, a first conveying chamber 52, a second conveying chamber 53, a first communication portion 54, and a second communication portion 55.

The partition portion 51 is provided at a lower portion in an inside of the developing container 50. The partition portion 51 is arranged at a substantially central portion in a direction that intersects with the longitudinal direction of the developing container 50 (right-and-left lateral direction in FIG. 4, that is, upper-and-lower direction in FIG. 5). The partition portion 51 is formed into a substantially plate-like shape that extends in the longitudinal direction and an upper-and-lower direction of the developing container 50. The partition portion 51 divides the inside of the developing container 50 in the direction that intersects with the longitudinal direction.

The first conveying chamber 52 and the second conveying chamber 53 are provided in the developing container 50. The first conveying chamber 52 and the second conveying chamber 53 are formed by the division of the inside of the developing container 50 by the partition portion 51. The first conveying chamber 52 and the second conveying chamber 53 are arranged parallel to each other at substantially the same height.

The second conveying chamber 53 is arranged below and adjacent to an area where the developing roller 44 is arranged among areas in the developing container 50. The first conveying chamber 52 is arranged in an area that is farther from the developing roller 44 than the second conveying chamber 53 is far among the areas in the developing container 50. A developer replenishing tube (not shown) is connected to the first conveying chamber 52, and the developer is replenished through this developer replenishing tube. In the first conveying chamber 52, the first conveying member 42 conveys the developer in a first direction f1. In the second conveying chamber 53, the second conveying member 43 conveys the developer in a second direction f2 that is opposite to the first direction f1.

The first communication portion 54 and the second communication portion 55 are arranged respectively on outsides of both end portions in a longitudinal direction of the partition portion 51. The first communication portion 54 and the second communication portion 55 allow the first conveying chamber 52 and the second conveying chamber 53 to communicate with each other in a direction that intersects with the longitudinal direction of the partition portion 51 (the right-and-left lateral direction in FIG. 4, that is, the upper-and-lower direction in FIG. 5), that is, in a thickness direction of the partition portion 51 having the substantially plate-like shape. In other words, the first communication portion 54 and the second communication portion 55 allow the first conveying chamber 52 and the second conveying chamber 53 to communicate with each other on sides where both end portions in longitudinal directions of the first conveying chamber 52 and the second conveying chamber 53 are present.

The first communication portion 54 allows a downstream end in the first direction f1 of the first conveying chamber 52 and an upstream end in the second direction f2 of the second conveying chamber 53 to communicate with each other. Through the first communication portion 54, the developer is conveyed from a side where the first conveying chamber 52 is present to a side where the second conveying chamber 53 is present. The second communication portion 55 allows a downstream end in the second direction f2 of the second conveying chamber 53 and an upstream end in the first direction f1 of the first conveying chamber 52 to communicate with each other. Through the second communication portion 55, the developer is conveyed from the side where the second conveying chamber 53 is present to the side where the first conveying chamber 52 is present.

The first conveying member 42 is arranged in the first conveying chamber 52. The second conveying chamber 53 is arranged in the second conveying chamber 53. The second conveying member 43 extends near and parallel to the developing roller 44. The first conveying member 42 and the second conveying member 43 are supported in the developing container 50 in a manner that allows the first conveying member 42 and the second conveying member 43 to rotate about their axes that extend in the horizontal direction and parallel to the developing roller 44. The first conveying member 42 and the second conveying member 43 basically have the same configuration including a helical blade that is provided to an outer peripheral portion of a rotary shaft which extends along the longitudinal direction of the developing container 50.

In the first conveying chamber 52, the first conveying member 42 stirs and conveys the developer along the direction of the rotation axis, that is, in the first direction f1 from a side where the second communication portion 55 is present to a side where the first communication portion 54 is present. In the second conveying chamber 53, the second conveying member 43 stirs and conveys the developer along the direction of the rotation axis, that is, in the second direction f2 from the side where the first communication portion 54 is present to the side where the second communication portion 55 is present. In other words, the first conveying member 42 and the second conveying member 43 circulate the developer in a predetermined circulating direction by stirring and conveying the developer in directions opposite to each other.

In the developing container 50, the developing roller 44 is located above the second conveying member 43, and is arranged to face the photosensitive drum 21. The developing roller 44 is supported in the developing container 50 in a manner that allows the developing roller 44 to rotate about its axis that extends in the horizontal direction and parallel to an axis of the photosensitive drum 21. The developing roller 44 includes a cylindrical developing sleeve 441 that rotates, for example, counterclockwise in FIG. 3 and FIG. 4, and a fixed magnet 442 that is fixed in the developing sleeve 441 in a manner that does not allow the fixed magnet 442 to rotate (refer to FIG. 4 and FIG. 7).

A part of an outer peripheral surface of the developing roller 44 is exposed out of the developing container 50, and faces close to the photosensitive drum 21. The developing roller 44 carries, on its outer peripheral surface, the toner to be supplied onto the outer peripheral surface of the photosensitive drum 21 in an area where the developing roller 44 faces the photosensitive drum 21. The developing roller 44 carries and supplies the toner in the second conveying chamber 53 of the developing container 50 onto the photosensitive drum 21. In other words, the developing roller 44 causes the toner in the second conveying chamber 53 to adhere to the electrostatic latent image on the outer peripheral surface of the photosensitive drum 21, thereby forming the toner image.

The regulating member 45 is arranged on an upstream side in a rotation direction of the developing roller 44 in the area where the developing roller 44 and the photosensitive drum 21 face each other. The regulating member 45 is arranged to be face close to the developing roller 44 with a predetermined clearance between its distal end and the outer peripheral surface of the developing roller 44. The regulating member 45 extends all over the axial direction of the developing roller 44. The regulating member 45 regulates a layer thickness of the developer (toner) that is carried on the outer peripheral surface of the developing roller 44 and that passes through the gap between the distal end of the regulating member 45 and the outer peripheral surface of the developing roller 44.

The first conveying member 42 and the second conveying member 43 are rotated to cause the developer in the developing container 50 to circulate in the predetermined circulating direction through the first communication portion 54 and the second communication portion 55 between the first conveying chamber 52 and the second conveying chamber 53. At this time, the toner in the developing container 50 is electrically charged by being stirred, and then carried on the outer peripheral surface of the developing roller 44. The layer thickness of the toner carried on the outer peripheral surface of the developing roller 44 is regulated by the regulating member 45, and then the toner itself is conveyed by the rotation of the developing roller 44 to the area where the developing roller 44 and the photosensitive drum 21 face each other. The application of the predetermined developing voltage to the developing roller 44 causes a difference between a potential of the outer peripheral surface of the developing roller 44 and the potential of a surface (the outer peripheral surface) of the photosensitive drum 21. With this, the toner carried on the outer peripheral surface of the developing roller 44 is moved to the outer peripheral surface of the photosensitive drum 21 in the facing area. In this way, the electrostatic latent image on the outer peripheral surface of the photosensitive drum 21 is developed by the toner.

Next, the configuration of the developing device 40 is described in more detail with reference to FIG. 4, FIG. 5, FIG. 6, and FIG. 7. Note that, arrows indicating an air-flow direction fd in a duct 61 are shown in FIG. 4 and FIG. 6.

The developing device 40 includes a toner trapping mechanism 60. The toner trapping mechanism 60 includes the duct 61, a filter 62, and an exhaust fan 63, and a vibration generating unit 64. The filter 62 includes a first filter 621 and a second filter 622.

The duct 61 is arranged adjacent to the second conveying chamber 53. In the direction that intersects with the longitudinal direction of the developing container 50 (right-and-left lateral direction in FIG. 4, that is, a depth direction in the drawing sheet of FIG. 6), the duct 61 faces the photosensitive drum 21 across the area where the developing roller 44 is arranged among the areas in the developing container 50. An upstream end in the air-flow direction fd of the duct 61 is connected to the second conveying chamber 53. The duct 61 allows air in the second conveying chamber 53 to flow therethrough. The duct 61 includes an intake port 611 and an exhaust port 612.

The intake port 611 is arranged at a portion where the duct 61 and the second conveying chamber 53 are connected to each other above the developing roller 44. In other words, the intake port 611 is located at the upstream end in the air-flow direction fd of the duct 61. The intake port 611 is opened all over the longitudinal direction of the second conveying chamber 53. The intake port 611 is formed, for example, into a rectangular shape that extends in the longitudinal direction of the second conveying chamber 53, and faces the developing roller 44. The intake port 611 allows an inside of the second conveying chamber 53 and an inside of the duct 61 to communicate with each other. The air in the second conveying chamber 53 flows into the duct 61 through the intake port 611.

The exhaust port 612 is arranged, for example, at a back of the developing container 50. The exhaust port 612 is located at a downstream end in the air-flow direction fd of the duct 61. The air in the second conveying chamber 53 is exhausted from the inside of the duct 61 through the exhaust port 612. Note that, the exhaust port 612 of the duct 61 may be connected to another exhaust path that is provided in the body 2 and that includes a fan.

The exhaust fan 63 is connected to the exhaust port 612. When the exhaust fan 63 is driven, the air in the second conveying chamber 53 is forcibly discharged to an outside through the duct 61. In other words, the exhaust fan 63 causes the air in the second conveying chamber 53 to flow out to the outside through the duct 61.

The first filter 621 is arranged at a part corresponding to the intake port 611 being the portion where the duct 61 and the second conveying chamber 53 are connected to each other. The first filter 621 is formed, for example, into the same shape as that of the intake port 611, that is, the rectangular shape that extends in the longitudinal direction of the second conveying chamber 53. The first filter 621 covers the intake port 611. In other words, the first filter 621 faces the developing roller 44. The first filter 621 is made, for example, of nonwoven fabric, and traps the toner that is contained in the air which flows from the second conveying chamber 53 into the duct 61.

The second filter 622 is arranged on a downstream side relative to the first filter 621 in the air-flow direction fd in the duct 61. The second filter 622 is formed into the same shape as that of a cross-section in a direction that intersects with the air-flow direction fd in the duct 61, that is, the rectangular shape that extends in the longitudinal direction of the second conveying chamber 53. The second filter 622 covers a cross-section of the air-flow in the duct 61. The second filter 622 is made, for example, of nonwoven fabric, and traps the toner that is contained in the air which flows in the duct 61 through the first filter 621.

TABLE 1

| | Pressure Drop [mmAq] |
|---|---|
| First Filter | 0.42 |
| Second Filter | 4.50 |

Table 1 shows an example of performance of the first filter 621 and the second filter 622. When upstream static pressure and downstream static pressure were measured at an air-flow rate of 10 cm/s, the first filter 621 caused a pressure drop of 0.42 mmAq, and the second filter 622 caused a pressure drop of 4.50 mmAq. In addition, the second filter 622 was higher, for example, in both 0.3-1 μm trapping rate and 8-1 μm trapping rate than the first filter 621.

By the above-described configuration of the filter 62, the first filter 621 is configured to be incapable of trapping the toner in the second conveying chamber 53 by a large amount, that is, configured to be prevented from being clogged. In addition, the second filter 622 can prevent the toner from leaking to an outside of the developing container 50.

The vibration generating unit 64 is arranged, for example, adjacent to a back surface of the developing container 50. The vibration generating unit 64 includes a vibration motor, a control board, and other electronic circuits and electronic components (none of which is shown). An oscillating weight with its center of gravity off-center from a rotation axis of an output shaft of the vibration motor is attached to the output shaft.

The vibration generating unit 64 is connected to the first filter 621. When the vibrating motor is driven, the vibration generating unit 64 vibrates the first filter 621. By causing the vibration generating unit 64 to vibrate the first filter 621, the toner trapped by and adhering to the first filter 621 can be dropped. With this, performance of the first filter 621 can be restored, and toner scattering in the image forming apparatus 1 can be continuously suppressed.

Figure 8:
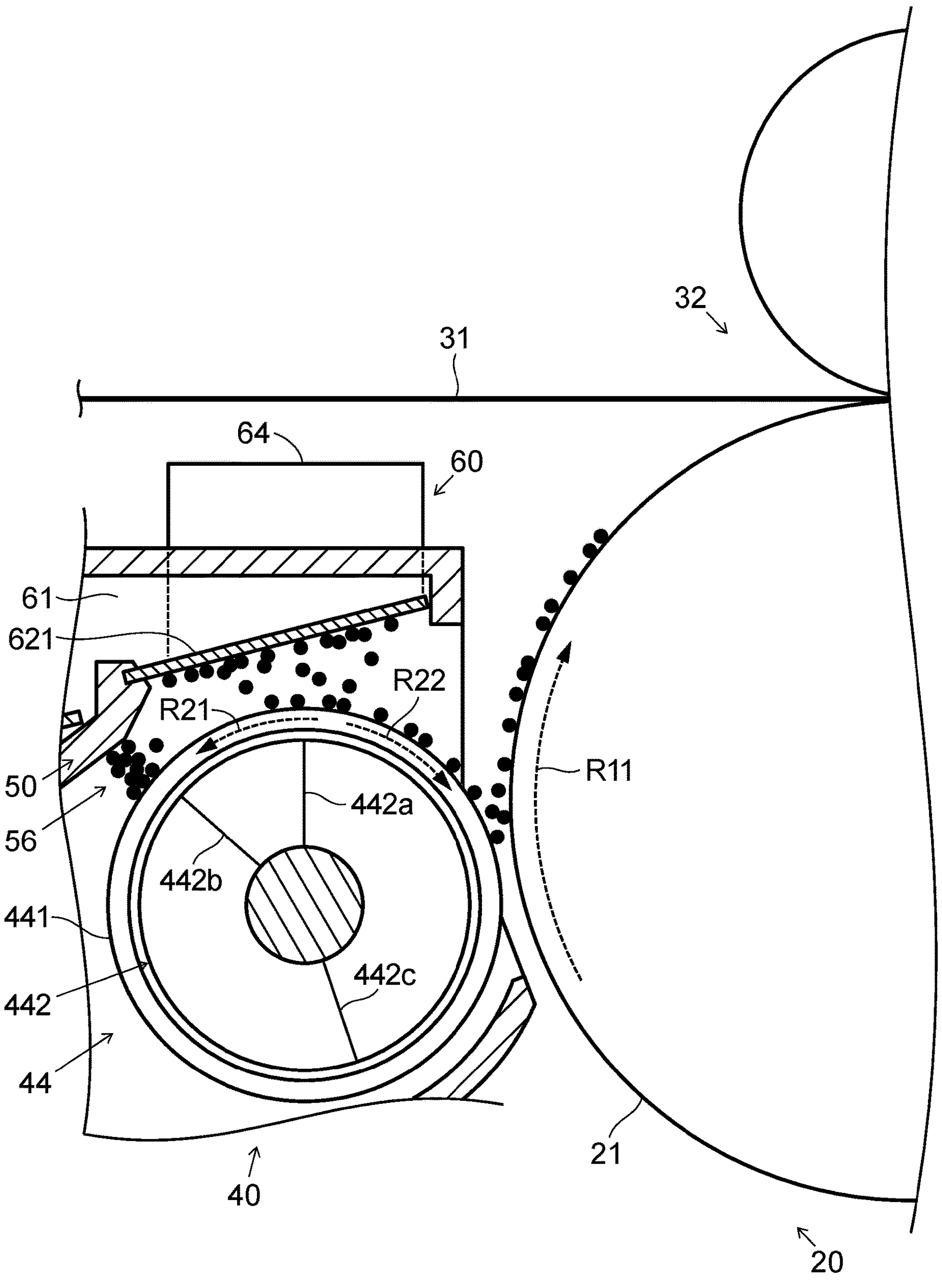
FIG. 8 is a partially enlarged cross-sectional front view of the vicinity of the image forming section in FIG. 3, that is, an explanatory view of a scattered-toner recovery mode.

In this context, the control section 8 of the image forming apparatus 1 is capable of carrying out a scattered-toner recovery mode in which the toner trapped by the first filter 621 is recovered by the drum cleaning unit 23. FIG. 8 is a partially enlarged cross-sectional front view of the vicinity of the image forming section 20 in FIG. 3, that is, an explanatory view of the scattered-toner recovery mode.

Note that, arrows indicating a rotation direction R11 of the photosensitive drum 21 at the time of the image formation, a rotation direction R21 of the developing roller 44 at the time of the image formation, and a rotation direction R22 of the developing roller 44 in the scattered-toner recovery mode are shown in FIG. 8. The rotation direction R21 and the rotation direction R22 of the developing roller 44 are reverse to each other. In addition, for the sake of convenience of description, below the first filter 621 in FIG. 8, the toner dropped from the first filter 621 is depicted as particles (solid circles) on the outer peripheral surface of the developing roller 44 and the outer peripheral surface of the photosensitive drum 21. However, actual toner particles are significantly smaller than the toner particles (solid circles) depicted in FIG. 8.

In the scattered-toner recovery mode, while the image formation is not performed, the control section 8 causes the vibration generating unit 64 to vibrate the first filter 621. In addition, the control section 8 causes the charging unit 22 and the voltage application section 12 to cause the potential difference in a direction in which the toner is moved from the developing roller 44 to the photosensitive drum 21, causes the developing roller 44 to rotate in the direction reverse to that at the time of the image formation (rotation direction R22 in FIG. 8), and causes the photosensitive drum 21 to rotate in the same direction as that at the time of the image formation (rotation direction R11 in FIG. 8). With this, in the scattered-toner recovery mode, the scattered toner dropped from the first filter 621 and adhering to the outer peripheral surface of the developing roller 44 can be recovered by the drum cleaning unit 23 through intermediation of the photosensitive drum 21. Note that, in the scattered-toner recovery mode, transfer bias is not applied at the primary transfer unit 32 so that the toner adhering to the outer peripheral surface of the photosensitive drum 21 is not moved from the photosensitive drum 21 to the intermediate transfer belt 31.

In addition, as illustrated in FIG. 7 and FIG. 8, the developing roller 44 includes the developing sleeve 441 and the fixed magnet 442.

The developing sleeve 441 has a hollow cylindrical shape that extends along the axial direction of the developing roller 44, and is supported in the developing container 50 in a manner that allows the developing sleeve 441 to rotate. The developing sleeve 441 carries the developer on its outer peripheral surface.

The fixed magnet 442 has a columnar shape that extends along the axial direction of the developing roller 44, and is fixed in the developing sleeve 441 in the manner that does not allow the fixed magnet 442 to rotate. The fixed magnet 442 extends all over the developing sleeve 441 along the axial direction.

The fixed magnet 442 has a plurality of magnetic poles that are arrayed in a circumferential direction of the developing sleeve 441. The fixed magnet 442 has, as the plurality of these magnetic poles, a first pole 442*a*, a second pole 442*b*, and a third pole 442*c*. These magnetic poles are arrayed in an order of the first pole 442*a*, the second pole 442*b*, and the third pole 442*c* along the rotation direction R21 of the developing sleeve 441 at the time of the image formation. Note that, the fixed magnet 442 has other magnetic poles.

The first pole 442*a* is arranged to face the first filter 621. In other words, the first pole 442*a* is located vertically below the first filter 621. The developer is carried on the outer peripheral surface of the developing sleeve 441 by magnetic force of the first pole 442*a*, and is conveyed in the direction of the rotation of the developing sleeve 441 along with this rotation.

The second pole 442*b* is arranged on a downstream side relative to the first pole 442*a* in the rotation direction R21 of the developing sleeve 441 at the time of the image formation. Specifically, the second pole 442*b* is arranged following the first pole 442*a* on a downstream side relative to vertically below a downstream end of the first filter 621 in the rotation direction R21 of the developing sleeve 441 at the time of the image formation. The developer is carried on the outer peripheral surface of the developing sleeve 441 by magnetic force of the second pole 442*b*, and is conveyed in the direction of the rotation of the developing sleeve 441 along with this rotation.

Note that, the first pole 442*a* and the second pole 442*b* have polarities opposite to each other.

The third pole 442*c* is arranged following the second pole 442*b* on a downstream side relative to the second pole 442*b* in the rotation direction R21 of the developing sleeve 441 at the time of the image formation. The developer is carried on the outer peripheral surface of the developing sleeve 441 by magnetic force of the third pole 442*c*, and is conveyed in the direction of the rotation of the developing sleeve 441 along with this rotation.

Note that, the second pole 442*b* and the third pole 442*c* have the same polarity.

An area where the developing sleeve 441 faces the second pole 442*b* among areas of the developing sleeve 441 is arranged with a gap 56 relative to the developing container 50. In other words, in the area where the developing sleeve 441 faces the second pole 442*b*, the developing sleeve 441 is arranged with the gap 56 relative to the developing container 50 that the developing sleeve 441 faces in a radial direction of the developing roller 44. As illustrated in FIG. 7, a length L1 of the gap 56 is smaller than a length L2 between the developing sleeve 441 and the first filter 621.

Example

Next, rating of the toner scattering in the image forming apparatus 1 is described. In this rating, an image corresponding to a coverage rate of 20% was printed onto 600,000 sheets S, and then whether or not the toner scattering into the image forming apparatus 1 had occurred was checked. Note that, this rating was carried out in both a normal-temperature and normal-humidity environment (23° C. and 50%) and a high-temperature and high-humidity environment (28° C. and 80%).

In addition, in this rating, the scattered-toner recovery mode was carried out every time 4,000 sheets S were printed. Specifically, every time 4,000 sheets S were printed, the vibration generating unit 64 was operated, and the developing roller 44 was reversely rotated. At this time, the developing voltage was set to 150V, and the surface potential of the photosensitive drum 21 was set to 20V.

Table 2 shows arrangements of the magnetic poles of the fixed magnet 442. As shown in Table 2, in this rating, the image forming apparatuses 1 according to Example 1 and Example 2 of the present disclosure, and an image forming apparatus according to Comparative Example were prepared, the three image-forming apparatuses being different from each other in the arrangement of the magnetic poles of the fixed magnet 442.

TABLE 2

| | First Pole | | Second Pole | | Third Pole | |
|---|---|---|---|---|---|---|
| | Polarity | Magnetic Force [mT] | Polarity | Magnetic Force [mT] | Polarity | Magnetic Force [mT] |
| Comparative Example | N | 65 | S | 35 | N | 60 |
| Example 1 | N | 65 | S | 35 | S | 60 |
| Example 2 | N | 65 | S | 60 | S | 60 |

As shown in Table 2, a polarity and magnetic force of the first pole 442*a* that was arranged to face the first filter 621 among the magnetic poles of the fixed magnet 442 were an N-pole and 65 mT in all of Examples 1 and 2 and Comparative Example. A polarity and magnetic force of the second pole 442*b* of the fixed magnet 442 were an S-pole and 35 mT in Example 1 and Comparative Example, and were the S-pole and 60 mT in Example 2. A polarity and magnetic force of the third pole 442*c* of the fixed magnet 442 were the N-pole and 60 mT in Comparative Example, and were the S-pole and 60 mT in Examples 1 and 2.

In addition, in this rating, the length L1 of the gap 56 which is formed between the developing container 50 and the area where the developing sleeve 441 faces the second pole 442*b* among the areas of the developing sleeve 441, and across which the developing sleeve 441 faces the developing container 50 in the radial direction of the developing roller 44 was 10 mm. Table 3 shows results of the rating.

TABLE 3

| | Toner Scattering Check | |
|---|---|---|
| | 23° C. and 50% | 28° C. and 80% |
| Comparative Example | Good | Poor |
| Example 1 | Good | Good |
| Example 2 | Good | Good |

The toner scattering check shown in Table 3 was made by visually checking an extent of the toner scattering in the image forming apparatuses. The results of the "toner scattering check" were determined to be "Good" if the toner scattering had not been found and insides of the apparatuses had been kept clean, and determined to be "Poor" if the toner scattering had been found and the insides of the apparatuses had been fouled with scattered toner.

Table 3 demonstrates that the toner scattering occurred in the image forming apparatus according to Comparative Example in the high-temperature and high-humidity environment. Table 3 also demonstrates that, in contrast, the toner scattering did not occur in the image forming apparatuses 1 according to Examples 1 and 2 of the present disclosure in the normal-temperature and normal-humidity environment nor in the high-temperature and high-humidity environment.

In such a way, in the configuration according to this embodiment, the toner trapping mechanism 60 for sucking and trapping the scattered toner is formed in the developing device 40, and the scattered toner trapped by the filter 62 can be recovered using the drum cleaning unit 23 through intermediation of the developing roller 44 and the photosensitive drum 21.

Note that, in the high-temperature and high-humidity environment, a toner charge amount is likely to decrease, and an amount of the scattered toner tends to increase. Probably, in the image forming apparatus according to Comparative Example, the scattered toner that had dropped from the first filter 621 and adhered onto the outer peripheral surface of the developing roller 44 advanced into the second conveying chamber 53 in the developing container 50. As a result, probably, the toner scattered by a larger amount to foul the inside of the apparatus.

In contrast, in the configurations according to Examples 1 and 2, the second pole 442*b* and the third pole 442*c* of the fixed magnet 442 had the same polarity to generate a repulsive magnetic field. In addition, the length L1 of the gap 56 in the developing container 50 was smaller than the length L2 between the developing sleeve 441 and the first filter 621.

With this, at a part corresponding to the gap 56 in the developing container 50, the developer was stopped and deposited to form a developer lump. As a result, the scattered toner that had dropped from the first filter 621 was successfully suppressed from advancing into the second conveying chamber 53 in the developing container 50. Thus, the image forming apparatuses 1 according to Examples 1 and 2 successfully caused the scattered toner that had dropped from the first filter 621 by a large amount to adhere onto the outer peripheral surface of the developing roller 44, and successfully and efficiently recovered the scattered toner through intermediation of the photosensitive drum 21. Thus, with a downsized configuration, the toner scattering in the image forming apparatuses 1 can be suppressed.

Note that, the length L1 of the gap 56 between the developing sleeve 441 and the developing container 50 is preferred to be twice or less as large as a height of the deposit of the developer on an outer peripheral surface of the area where the developing sleeve 441 faces the second pole 442*b* among the areas of the developing sleeve 441. This configuration enables the developer lump to be easily formed at the part corresponding to the gap 56 in the developing container 50. With this, effect of suppressing the scattered toner dropped from the first filter 621 from advancing into the second conveying chamber 53 can be enhanced. Thus, the scattered toner can be efficiently recovered.

Further, the length L1 of the gap 56 between the developing sleeve 441 and the developing container 50 is desired to be 10 mm or less. This configuration enables effect of forming the developer lump at the part corresponding to the gap 56 in the developing container 50 to be enhanced. With this, the scattered toner can be further efficiently recovered.

Still further, the second pole 442*b* and the third pole 442*c* of the fixed magnet 442 are arranged at an interval of a central angle of 150 degrees or less in the rotation direction of the developing sleeve 441. This configuration enables effect of the repulsive magnetic field between the second pole 442*b* and the third pole 442*c* to be enhanced. With this, the developer lump can be easily formed at the part corresponding to the gap 56 in the developing container 50. In other words, the effect of suppressing the scattered toner dropped from the first filter 621 from advancing into the second conveying chamber 53 can be enhanced. Thus, the scattered toner can be efficiently recovered.

Yet further, the second pole 442*b* is preferred to have magnetic force that is greater than that of the first pole 442*a*. This configuration also enables the effect of the repulsive magnetic field between the second pole 442*b* and the third pole 442*c* to be enhanced. With this, the developer lump can be easily formed at the part corresponding to the gap 56 in the developing container 50. In other words, the effect of suppressing the scattered toner dropped from the first filter 621 from advancing into the second conveying chamber 53 can be enhanced. Thus, the scattered toner can be efficiently recovered.

Yet further, the control section 8 carries out the scattered-toner recovery mode every time a predetermined number of sheets are printed. For example, in the image forming apparatuses 1 according to Examples 1 and 2, the control section 8 carried out the scattered-toner recovery mode every time 4,000 sheets were printed. This configuration enables the scattered toner trapped by the filter 62 to be regularly recovered using the drum cleaning unit 23 through intermediation of the developing roller 44 and the photosensitive drum 21. Thus, effect of suppressing the toner scattering in the image forming apparatuses 1 can be enhanced.

Yet further, the developer to be used for forming the toner images is the two-component developer that contains the magnetic carrier and the toner. The two-component developer is known for its liability to cause the toner scattering from the developing container Thus, by carrying out the above-described scattered-toner recovery mode in the image forming apparatuses 1 that use the two-component developer, the toner scattering in the image forming apparatuses 1 can be further effectively suppressed.

Yet further, the photosensitive drum 21 has, on its outer peripheral surface, the photosensitive layer formed of the amorphous-silicon photosensitive member. The photosensitive layer formed of the amorphous-silicon photosensitive member is known for its high dielectric constant and small toner-charge amount. The small toner-charge amount is liable to cause the toner scattering from the developing container 50. Thus, by carrying out the above-described scattered-toner recovery mode in the image forming apparatuses 1 that use the photosensitive drum 21 including the amorphous-silicon photosensitive member, the toner scattering in the image forming apparatuses 1 can be further effectively suppressed.

The scope of the present disclosure is not limited to the above-described embodiment of the present disclosure, and may be embodied with various modifications without departing from the gist of the present disclosure.

For example, the image forming apparatus 1 according to the above-described embodiment is not limited to the image forming apparatus for color printing and of what is called a tandem type that forms images by sequentially superimposing images in a plurality of colors. The image forming apparatus may be an image forming apparatus for color printing and of a non-tandem type, or may be an image forming apparatus for monochromatic printing.

What is claimed is:

1. An image forming apparatus, comprising:

an image bearing member that has an outer peripheral surface on which an electrostatic latent image is formed;

a charging unit that is configured to charge the outer peripheral surface of the image bearing member;

a cleaning unit that is configured to clean the outer peripheral surface of the image bearing member;

a developing device including a developing container that is configured to contain developer which contains toner to be supplied to the image bearing member, a developer conveying member that is supported in a conveying chamber of the developing container in a manner that allows the developer conveying member to rotate, and that is configured to circulate the developer by stirring and conveying the developer, and a developer carrying member that is supported in the developing container in a manner that allows the developer carrying member to rotate while the developer carrying member faces the image bearing member, and that is configured to supply the toner in the conveying chamber to the image bearing member;

a voltage application section that is configured to apply developing voltage to the developer carrying member; and a control section that is configured to control the image bearing member, the charging unit, the cleaning unit, the developing device, and the voltage application section, the developing device including a toner trapping mechanism which includes a duct that is connected to the conveying chamber, and that is configured to allow air in the conveying chamber to flow through the duct, a filter that is arranged at a portion where the duct and the conveying chamber are connected to each other above the developer carrying member, and that is configured to trap the toner which flows from the conveying chamber into the duct, an exhaust fan that is configured to cause the air in the conveying chamber to flow out to an outside through the duct, and a vibration generating unit that is configured to vibrate the filter, the control section being capable of carrying out a scattered-toner recovery mode in which, while image formation is prevented from being performed, scattered toner that has dropped from the filter and adhered to an outer peripheral surface of the developer carrying member is recovered by the cleaning unit through intermediation of the image bearing member by causing, by the control section, the vibration generating unit to vibrate the filter, by causing, by the control section, the charging unit and the voltage application section to cause a potential difference in a direction in which the toner is moved from the developer carrying member to the image bearing member, by causing, by the control section, the developer carrying member to rotate in a direction reverse to a direction at a time of the image formation, and by causing, by the control section, the image bearing member to rotate in a same direction as a direction at the time of the image formation, the developer carrying member including a developing sleeve that has a hollow cylindrical shape, that is rotatable, and that is configured to carry the developer on an outer peripheral surface of the developing sleeve, a fixed magnet that is fixed in the developing sleeve in a manner that prevents the fixed magnet from rotating, and that has a plurality of magnetic poles which are arrayed along a circumferential direction of the developing sleeve, the plurality of magnetic poles including a first pole that is arranged to face the filter, a second pole that is arranged following the first pole on a downstream side relative to vertically below a downstream end of the filter in the rotation direction of developing sleeve, and a third pole that is arranged following the second pole on a downstream side relative to the second pole, the first pole and the second pole having polarities opposite to each other, the second pole and the third pole having a same polarity, an area where the developing sleeve faces the second pole among areas of the developing sleeve being arranged with a gap relative to the developing container, a length of the gap being smaller than a length between the developing sleeve and the filter.

2. The image forming apparatus according to claim 1, wherein the length of the gap between the developing sleeve and the developing container is twice or less as large as a height of deposit of the developer on an outer peripheral surface of the area where the developing sleeve faces the second pole among the areas of the developing sleeve.

3. The image forming apparatus according to claim 2, wherein the length of the gap between the developing sleeve and the developing container is 10 mm or less.

4. The image forming apparatus according to claim 1, wherein the second pole and the third pole are arranged at an interval of a central angle of 150 degrees or less in the rotation direction of the developing sleeve.

5. The image forming apparatus according to claim 1, wherein the second pole has magnetic force that is greater than magnetic force of the first pole.

6. The image forming apparatus according to claim 1, wherein the control section carries out the scattered-toner recovery mode every time a predetermined number of sheets are printed.

7. The image forming apparatus according to claim 1, wherein the developer is two-component developer that contains magnetic carrier and the toner.

8. The image forming apparatus according to claim 1, wherein the image bearing member has, on the outer peripheral surface of the image bearing member, a photosensitive layer formed of an amorphous-silicon photosensitive member.

9. The image forming apparatus according to claim 1, wherein the filter includes a first filter that is opened all over a longitudinal direction of the conveying chamber, and that is configured to cover an intake port which is configured to allow an inside of the conveying chamber and an inside of the duct to communicate with each other, and a second filter that is arranged on a downstream side relative to the first filter in an air-flow direction in the duct, and that is configured to cover a cross-section of the air-flow in the duct.

* * * * *